Figure 4:
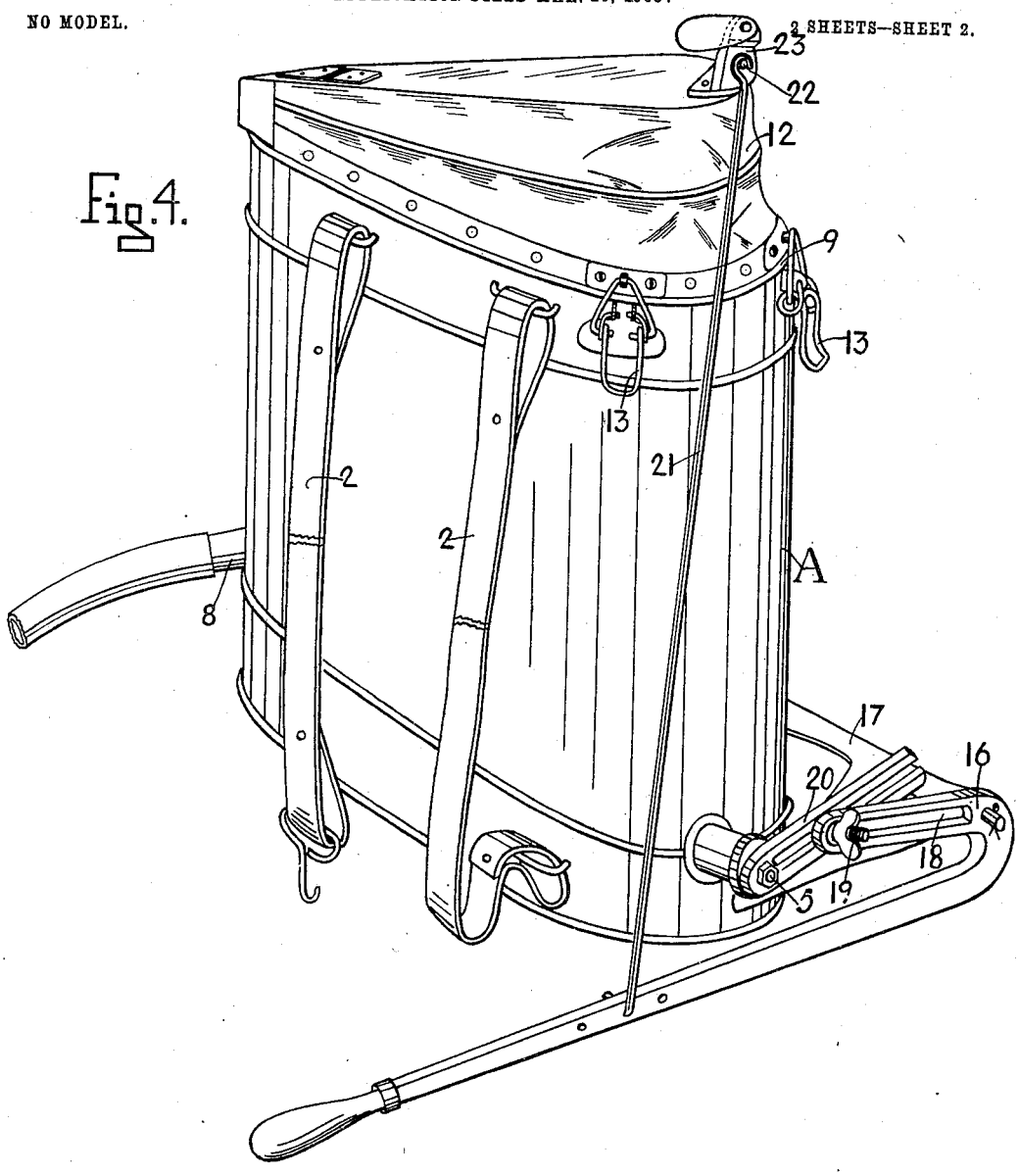

No. 735,887. PATENTED AUG. 11, 1903.
G. LAGOMARSINO.
APPARATUS FOR DISTRIBUTING POWDER UPON VINES, PLANTS, OR THE LIKE.
APPLICATION FILED MAR. 26, 1903.
NO MODEL. 2 SHEETS—SHEET 1.
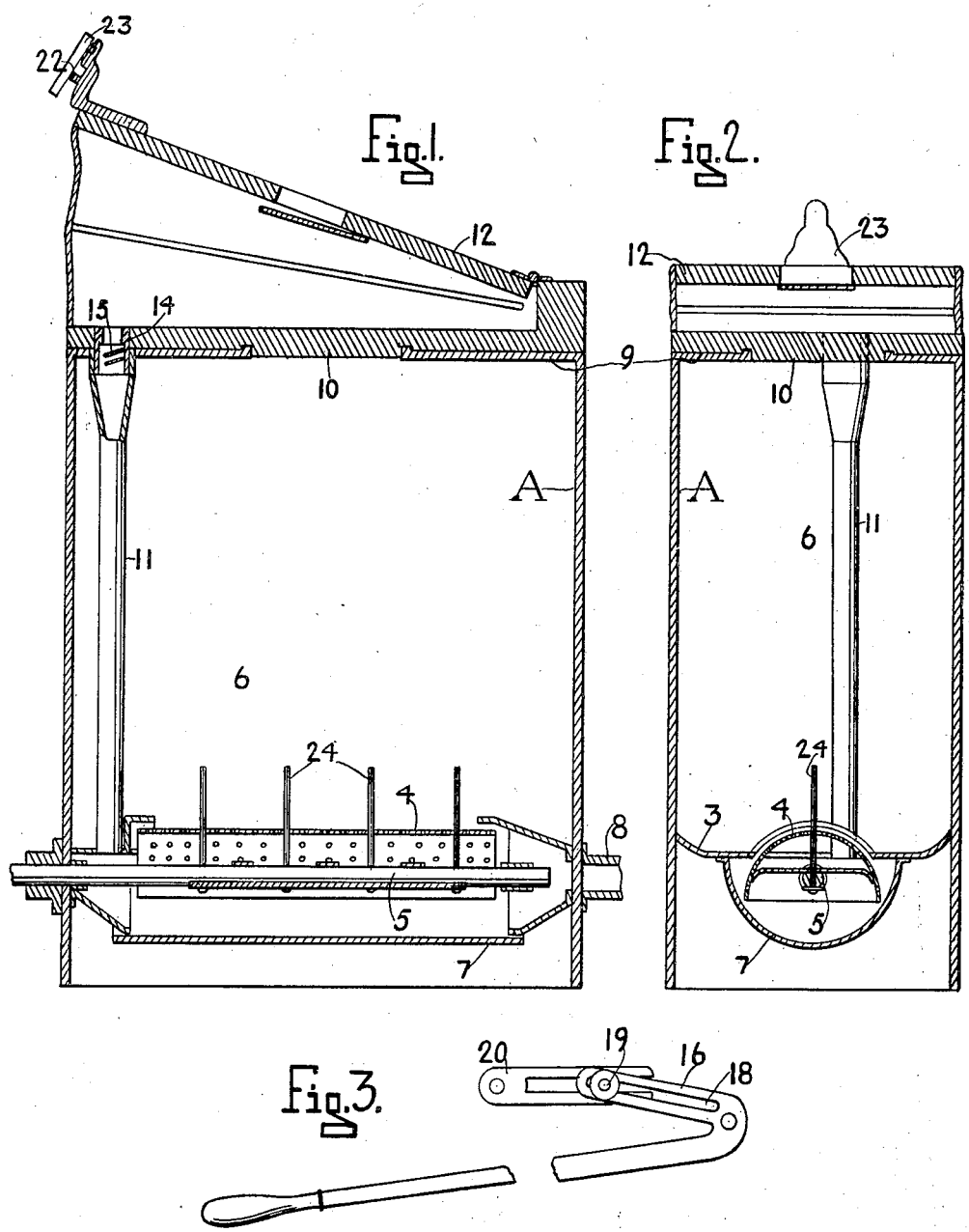

No. 735,887. PATENTED AUG. 11, 1903.
G. LAGOMARSINO.
APPARATUS FOR DISTRIBUTING POWDER UPON VINES, PLANTS, OR THE LIKE.
APPLICATION FILED MAR. 26, 1903.
NO MODEL. 2 SHEETS—SHEET 2.

WITNESSES:
John Oller.
J. Nowse

INVENTOR.
Giuseppe Lagomarsino
BY Geo. H. Strong
ATTORNEY.

No. 735,887. Patented August 11, 1903.

UNITED STATES PATENT OFFICE.

GIUSEPPE LAGOMARSINO, OF SAN FRANCISCO, CALIFORNIA.

APPARATUS FOR DISTRIBUTING POWDER UPON VINES, PLANTS, OR THE LIKE.

SPECIFICATION forming part of Letters Patent No. 735,887, dated August 11, 1903.

Application filed March 26, 1903. Serial No. 149,664. (No model.)

*To all whom it may concern:*

Be it known that I, GIUSEPPE LAGOMARSINO, a citizen of the United States, residing in the city and county of San Francisco, State of California, have invented an Improvement in Apparatus for Distributing Powder Upon Vines, Plants, and the Like; and I hereby declare the following to be a full, clear, and exact description of the same.

My invention relates to improvements in devices for dusting grape-vines, fruit-trees, plants, and the like with powdered sulfur or other suitable insecticide for the purpose of preserving them from the ravages of insects. Its object is to provide a light compact efficient apparatus capable of being easily carried upon the person and having convenient hand-operated means for creating an air-blast whereby the insecticide may be expelled and also having means for assisting and for regulating the discharge thereof.

It consists of the parts and the construction and combination of parts, as hereinafter more fully explained, having reference to the accompanying drawings, in which—

Figure 1 is a vertical longitudinal section of my invention. Fig. 2 is a vertical transverse section of the same. Fig. 3 is a front view of the operating-lever. Fig. 4 is a perspective view of the apparatus.

A represents a suitable portable container adapted to be supported on the back of the operator by straps 2. The interior of the container is made with the lower portion of its sides contracted, as shown at 3, and in the space between the edges of the inclines 3 a rotatable feed and agitator valve 4 is disposed. This valve is here represented in the form of a perforated cylindrical segment mounted on the rock-shaft 5 and projecting into the space within the container-chamber 6. The valve is inclosed in a removable housing portion 7, which is protected by the extensions of the walls of the container below the inclined bottom of chamber 6. The valve-chamber is thus in communication with chamber 6 through the perforations in the valve, and the material sifted into the valve-chamber is expelled in a fine spreading cloud of dust through the flexible pipe or hose 8, held in the hand of the operator and having a suitable nozzle at its outer end.

The container proper has a top 9 closed except for an opening 10 for the admission of material. A pipe 11 extends vertically through chamber 6 and has its upper end open and flush with top 9 and its lower end opening into the end of the valve-chamber opposite the discharge-pipe 8. A bellows 12 fits neatly over the top of the container and is removably held thereto by suitable locking devices 13. The bottom of the bellows has a padded portion fitting over opening 10 and forming a convenient air-tight closure therefor. The interior of the bellows is brought into communication with pipe 11 through means of a short telescoping section 14, in which is an outwardly-opening valve 15. A suitable pad or packing about the section effects a tight joint with pipe 11 when the bellows is locked down upon the container. The bellows thus being locked, chamber 6, which has previously been filled with powdered insecticide, is entirely closed except for the perforations in valve 4. This valve is adapted to be oscillated in unison with the operation of the bellows, so that on each actuation of the latter a current of air is forced downwardly through pipe 11 into the valve-chamber, where it meets the powder sifting through the valve, ejecting it thence through pipe 8 and the nozzle, which is directed in and about the vines and branches wherever it is desired the insecticide should reach.

The coördinate action of the valve and bellows is effected in the following manner: A bell-crank lever 16 is fulcrumed on a bracket 17, disposed at one end of the container. One arm of this lever is slotted, as at 18, and carries an adjustable pin projection 19, which is adapted to engage and slide in a slotted arm 20, rigid with the projecting end of rock-shaft 5, which, as before stated, carries valve 4. The longer arm of lever 16 extends at the side of the operator when the apparatus is in position on his back into convenient reach of his hand, and this handle portion is connected with the bellows by means of the rod 21. The latter has an eye portion engaging a projection 22 on the movable part of the bellows and is normally retained thereon by the pivoted latch-plate on keeper 23. This connection of the rod with the bellows enables the two parts to be quickly disunited whenever it is desired to remove the bellows for the purpose of recharging the container or for any other reason.

Valve 4 is provided with a series of radial pins 24, extending upwardly into the body of the material contained in holder A, and their action, together with that of the valve as the latter is oscillated, is to agitate the material to prevent its packing upon the valve and to cause it to sift down through the valve into the path of the air-blast created by the bellows. The continuous rocking of the valve operates on the body of material in holder A much after the fashion of a "nutmeg-grater," while the sloping walls 3 cause all the material to be directed downward upon the valve.

By adjusting pin 19 in slot 18 the movement of the valve relative to the bellows stroke may be varied, so that the powder may be more or less agitated, according to how dry it may be, and the proper feed into the valve-chamber thereby regulated.

Having thus described my invention, what I claim, and desire to secure by Letters Patent, is—

1. In a powder-distributer, the combination of a container having a feed-inlet in its top; a bellows seated upon the container and having its bottom to form a closure for the feed-inlet thereof, an oscillating perforated feed-valve disposed in the bottom of said container; an inclosure for the valve; and a valved air-pipe connecting the bellows with one end of the inclosure whereby a current of air is discharged through the inclosure just below the valve, said container having a discharge-opening communicating with the opposite end of the inclosure.

2. In a powder-distributer, the combination of a container having an inlet in its top; a bellows seated upon the container and having its bottom forming a closure for said opening; means detachably securing the bellows to the top of the container; a housing in the bottom of the container; an air-pipe connecting the bellows with one end of the housing, said container having a discharge connecting with the opposite end of the housing; a perforated segmental valve within the housing and means for actuating the valve correlative to the operation of the bellows.

3. In a powder-distributer, the combination of a holder, means thereupon for creating an air-blast, said holder having an opening for the admission of material and a discharge-outlet therefor, air-blast means upon said holder adapted as a closure for said inlet-opening, means detachably securing the air-blast means in place on the holder; an air-delivery pipe secured to the holder, a short tube on the bellows telescopically fitting said air-delivery pipe, a valve disposed in the discharge controlling the delivery of material thereinto, and means for actuating said valve.

4. In a powder-distributer, the combination of a holder having an opening for the admission of material and a discharge-opening therefor, valve mechanism in relation to the latter opening, operating means for said mechanism, a bellows forming a closure for the inlet-opening of the holder, and means for conducting air-currents from said bellows across the path of said discharge-opening.

5. In a powder-distributer, the combination of a holder having a discharge-opening, a segmental perforated valve in said opening, a housing for said valve, a bellows detachably carried by said holder, connections between said bellows and housing and including an air-delivery pipe in the holder and a pipe-section on the bellows telescopically fitting said pipe whereby a current of air may be delivered into the housing, and an outlet from said housing.

6. In a powder-distributing apparatus, the combination of a holder having an inlet and a discharge-opening, a segmental valve in said holder, a bellows detachably seated upon the holder and having its bottom to form a closure for the inlet thereof, means detachably securing the bellows in position, means for conducting an air-blast therefrom across the path of said valved discharge, and means including a bell-crank for operating the valve and bellows in unison.

7. In a powder-distributing apparatus, the combination of a holder having downwardly-converging sides and a discharge-opening in its bottom, an incased segmental valve in said opening, a bellows, air connections between the latter and the chamber of said valve, means including a bell-crank lever for operating the bellows and valve in unison, and means including the pivoted keeper 23 for detachably connecting the bellows and said lever.

In witness whereof I have hereunto set my hand.

GIUSEPPE LAGOMARSINO.

Witnesses:
S. H. NOURSE,
JESSIE C. BRODIE.